United States Patent
Germscheid et al.

(12) 
(10) Patent No.: US 6,751,618 B1
(45) Date of Patent: Jun. 15, 2004

(54) METHOD AND APPARATUS FOR A WEB APPLICATION SERVER TO UPLOAD MULTIPLE FILES AND INVOKE A SCRIPT TO USE THE FILES IN A SINGLE BROWSER REQUEST

(75) Inventors: Paul S. Germscheid, North Oaks, MN (US); Eugene J. Gretter, Lino Lake, MN (US); Daryl J. Kress, Hugo, MN (US); Timothy J. Guhl, Andover, MN (US); Gail L. Behr, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/449,288

(22) Filed: Nov. 24, 1999

(51) Int. Cl.[7] ............................. G06F 17/30; G06F 7/00
(52) U.S. Cl. ......................... 707/10; 707/204; 707/205
(58) Field of Search .......................... 707/10, 205, 201; 709/201, 24

(56) References Cited

U.S. PATENT DOCUMENTS 4,999,766 A * 3/1991 Peters et al. ................... 707/10
6,070,174 A * 5/2000 Starek et al. .................. 707/206
6,317,777 B1 * 11/2001 Skarbo et al. ................. 709/203
6,324,539 B1 * 11/2001 Gebauer ......................... 707/10
6,332,146 B1 * 12/2001 Jebens et al. ............... 707/104.1

* cited by examiner

*Primary Examiner*—Greta Robinson
*Assistant Examiner*—Susan Rayyan
(74) *Attorney, Agent, or Firm*—Charles A. Johnson; Mark T. Starr; Nawrocki, Rooney & Siverston, P.A.

(57) ABSTRACT

An apparatus for and method of utilizing an internet terminal coupled to the world wide web to access an existing proprietary data base management system having a dialog-based request format. The multiple file upload user request is received by a web server from the world wide web. Each of the files is stored in a different temporary file created to buffer the uploaded files until they are processed. Following processing, the temporary files are deleted. Through the use of this feature, an application developer can make efficient multiple file data transfers from a user terminal without the need to analyze the transfer in binary form.

20 Claims, 14 Drawing Sheets

| MESSAGE # | DESCRIPTION |
|---|---|
| 1. | ICISessionControl will call ICIConfigControlRuntime::GetEngine()with the bstrGatewayName set to the name of a gateway. |
| 2. | A CCIRuntimeGateway object whose name matches bstrGatewayName is necessary in order to determine the name of the CCIRuntimeConfig object to use. |
| 3. | A CCIRuntimeConfig object whose name matches the m_bstrConfigName property of the CCIRuntimeGateway object found in the previous step.<br><br>A CCIRuntimeConfig object is needed for two purposes:<br><br>1: To determine the name of the CCIRuntimeConnectionPool object.<br><br>2: To determine the properties that the ICIIEEngine will need. |
| 4. | A CCIRuntimeConnectionPool object whose name matches the m_bstrConnectionPoolName property of the CCIRuntimeConfig object found in the previous step.<br><br>A CCIRuntimeConnectionPool object is needed to determine which instance of a ICIICEEngine should be used for this request. |
| 5. | This method will iterate the m_oEngines collection to find an ICIIEEngine that is currently not busy |
| 6. | CreateEngine() is called when a new ICIIEEngine needs to be created and added to the m_oEngines collection.. |
| 7. | The ICIICEEngine::SetProperties() method is called using the properties from the CCIRuntimeConfig object specified with oRuntimeConfig parameter of the CCIRuntimeConnectionPool::FindEngine() method. These properties are provided to the ICIIEEngine so that if the oRuntimeConfig object is updated. the ICIIEEngine::will be unaffected. |
| 8. | The ICIICEEngine::SetDefASPFile method is called to dfine the default ASP file name. THe default ASP file name is a property of the CCIRuntimeGateway object. |
| 9. | A ICIICEEngine interface pointer is returned. |

FIG. 13

```
------7ce14419205e0\r\n
Content-Disposition: form-data: name="MyFile1":
filename="C:\Inetpub\wwwroot\FileUpload\images\wxCROSS.gif"\r\n
Content-Type: image/gif\r\n
\r\n
start of file1 data                    end of file1 data\r\n
------7ce14419205e0\r\n
Content-Disposition: form-data: name="MyFile2":
filename="C:\Inetpub\wwwroot\FileUpload\images\wxCROSS.gif"\r\n
Content-Type: image/gif\r\n
\r\n
start of file1 data                    end of file data data\r\n
------7ce14419205e0--\r\n
```

FIG. 14

METHOD AND APPARATUS FOR A WEB APPLICATION SERVER TO UPLOAD MULTIPLE FILES AND INVOKE A SCRIPT TO USE THE FILES IN A SINGLE BROWSER REQUEST

CROSS REFERENCE TO CO-PENDING APPLICATIONS

U.S. patent application Ser. No. 09/164,759, filed Oct. 1, 1998, and entitled, "A Common Gateway Which Allows Applets to Make Program Calls to OLTP Applications Executing on an Enterprise Server", now U.S. Pat. No. 6,397,220, issued May 28, 2002; U.S. patent application Ser. No. 09/164,932, filed Oct. 1, 1998, and entitled, "A Multi-Client User Customized DOM Gateway for an OLTP Enterprise Server Application"; U.S. patent application Ser. No. 09/164,908, filed Oct. 1, 1998, and entitled, "An Automated Development System for Developing Applications that Interface with Both Distributed Component Object Model (DOM) and Enterprise Server Environments", now U.S. Pat. No. 6.324.681 B1, issued Nov. 27, 2001; U.S. patent application Ser. No. 09/164,933, filed Oct. 1, 1998, and entitled, "Providing a Modular Gateway Architecture Which Isolates Attributes of the Client and Server Systems into Independent Components", now U.S. Pat. No. 6,212,546 B1, issued Apr. 3, 2001; U.S. patent application Ser. No. 09/164,862, filed Oct. 1, 1998, and entitled, "Making CGI Variables and Cookie Information Available to an OLTP System"; U.S. patent application Ser. No. 09/164,623, filed Oct. 1, 1998, and entitled, "A Gateway for Dynamically Providing Web Site Status Information", now U.S. Pat. No. 6,321,251 B1issued Nov. 20, 2001; U.S. patent application Ser. No. 09/164,756, filed Oct. 1, 1998, and entitled, "Development System for Automatically Enabling a Server Application to Execute with an XATMI-complaint transaction MGR : Managing Transactions within Multiple Environments", now U.S. Pat. No. 6,272,675, issued Aug. 7, 2001; U.S. patent application Ser. No. 09/189,053, filed Nov. 9, 1998, and entitled, "Cool ICE Batch Interface", now U.S. Pat. No. 6,370,532 B1, issued Apr. 9, 2001; U.S. patent application Ser. No. 09,189,381, filed Nov. 9, 1998, and entitled, "Cool ICE Debug"; U.S. patent application Ser. No. 09/188,628, filed Nov. 9, 1998, and entitled, "Cool ICE Workstation Directory/File Browser", now U.S. Pat. No. 6,411,995, issued Jun. 25, 2002; U.S. patent application Ser. No. 09/188,840, filed Nov. 9, 1998, and entitled, "Cool ICE Icons", now U.S. Pat. No. 6,351,746 B1 issued Feb. 26, 2002; U.S. patent application Ser. No. 09/188,738, filed Nov. 9, 1998, and entitled, "Cool ICE Service Templates", now U.S. Pat. No. 6,374,247 B1, issued Apr. 16, 2002; U.S. patent application Ser. No. 09/189,383, filed Nov. 9, 1998, and entitled, "Automatic Footer Text on HTML Pages"; U.S. patent application Ser. No. 09/189,615, filed Nov. 9, 1998, and entitled, "Availability Message"; U.S. patent application Ser. No. 09/189,612, filed Nov. 9, 1998, and entitled, "Cool ICE System Settings", now U.S. Pat. No. 6,415,288, issued Jul. 2, 2002; U.S. patent application Ser. No. 09/188,807, filed Nov. 9, 1998, and entitled, "Cool ICE Service Handler", now U.S. Pat. No. 6,370,588 B2, issued Apr. 9, 2002; U.S. patent application Ser. No. 09/189,611, filed Nov. 9, 1998, and entitled, "Server Side Variables"; "U.S. patent application Ser. No. 09/188,629, filed Nov. 9, 1998, and entitled, "Cool-ICE data Wizard", now U.S. Pat. No. 6,295, 531 B1, issued Jun. 4, 2001; U.S. patent application Ser. No. 09,189,365, filed Nov. 9, 1998, and entitled, "Cool ICE Table Profiling"; U.S. patent application Ser. No. 09/189, 160, filed Nov. 9, 1998, and entitled, "Cool ICE Database Profiling"; U.S. patent application Ser. No. 09/188,649, filed Nov. 9, 1998, and entitled, "Cool ICE Column Profiling"; U.S. patent application Ser. No. 09/949,213, filed Nov. 24, 1999, and entitled, "Cool ICE Method and Apparatus for a Web Application Server to Maintain Logon Security Mapped to a Gateway Through Server Based Session Objects"; U.S. patent application Ser. No. 09/448,169, filed Nov. 24, 1999, and entitled, "Cool ICE Method and Apparatus for a Web Application Server to Provide for Web User Validation"; U.S. patent application Ser. No. 09/448,154, filed Nov. 24, 1999, and entitled, "Cool ICE Method and Apparatus for a Web Application Server to Provide an Administration System Using a Dual Set of Tiered Groups of Objects"; and U.S. patent application Ser. No. 09/188, 725, filed Nov. 9, 1998, and entitled "Cool Ice State Management", now U.S. Pat. No. 6,324,539 B1, issued Nov. 27, 2001 are commonly assigned co-pending applications incorporated herein by reference.

BACKGROUND OF THE INVENTION

1. Field of the Invention

The present invention generally relates to data base management systems and more particularly relates to enhancements for providing access to data base management systems via internet user terminals.

2. Description of the Prior Art

Data base management systems are well known in the data processing art. Such commercial systems have been in general use for more than 20 years. One of the most successful data base management systems is available from Unisys Corporation and is called the MAPPER® data base management system. The MAPPER system can be reviewed using the MAPPER User's Guide, incorporated herein by reference, which may be obtained from Unisys Corporation.

The MAPPER system, which runs on various hardware platforms also available from Unisys Corporation, provides a way for clients to partition data bases into structures called cabinets, drawers, and reports, as a way to offer a more tangible format. The MAPPER data base manager utilizes various predefined high-level instructions whereby the data base user may manipulate the data base to generate human-readable data presentations. The user is permitted to prepare lists of the various predefined high-level instructions into data base manager programs called "MAPPER Runs". Thus, users of the MAPPER system may create, modify, and add to a given data base and also generate periodic and a periodic updated reports using various MAPPER Runs.

However, with the MAPPER system, as well as with similar proprietary data base management systems, the user must interface with the data base using a terminal coupled directly to the proprietary system and must access and manipulate the data using the MAPPER command language of MAPPER. Ordinarily, that means that the user must either be co-located with the hardware which hosts the data base management system or must be coupled to that hardware through dedicated data links. Furthermore, the user usually needs to be schooled in the command language of MAPPER (or other proprietary data base management system) to be capable of generating MAPPER Runs.

Since the advent of large scale, dedicated, proprietary data base management systems, the internet or world wide web has come into being. Unlike closed proprietary data base management systems, the internet has become a world wide bulletin board, permitting all to achieve nearly equal access using a wide variety of hardware, software, and communication protocols. Even though some standardization has developed, one of the important characteristics of the world wide web is its ability to constantly accept new and emerging techniques within a global framework. Many current users of the internet have utilized several generations of hardware and software from a wide variety of suppliers from all over the world. It is not uncommon for current day young children to have ready access to the world wide web and to have substantial experience in data access using the internet.

Thus, the major advantage of the internet is its universality. Nearly anyone, anywhere can become a user. That means that virtually all persons are potentially internet users without the need for specialized training and/or proprietary hardware and software. One can readily see that providing access to a proprietary data base management system, such as MAPPER, through the internet would yield an extremely inexpensive and universally available means for accessing the data which it contains and such access would be without the need for considerable specialized training.

There are two basic problems with permitting internet access to a proprietary data base. The first is a matter of security. Because the internet is basically a means to publish information, great care must be taken to avoid intentional or inadvertent access to certain data by unauthorized internet users. In practice this is substantially complicated by the need to provide various levels of authorization to internet users to take full advantage of the technique. For example, one might have a first level involving no special security features available to any internet user. A second level might be for specific customers, whereas a third level might be authorized only for employees. One or more fourth levels of security might be available for officers or others having specialized data access needs.

Existing data base managers have security systems, of course. However, because of the physical security with a proprietary system, a certain degree of security is inherent in the limited access. On the other hand, access via the internet is virtually unlimited which makes the security issue much more acute.

Current day security systems involving the world wide web involve the presentation of a user-id and password. Typically, this user-id and password either provides access or denies access in a binary fashion. To offer multiple levels of secure access using these techniques would be extraordinarily expensive and require the duplication of entire databases and or substantial portions thereof. In general, the advantages of utilizing the world wide web in this fashion to access a proprietary data base are directly dependent upon the accuracy and precision of the security system involved.

The second major problem is imposed by the internet protocol itself. One of the characteristics of the internet which makes it so universal is that any single transaction in HTML language combines a single transfer (or request) from a user coupled with a single response from the internet server. In general, there is no means for linking multiple transfers (or requests) and multiple responses. In this manner, the internet utilizes a transaction model which may be referred to as "stateless". This limitation ensures that the internet, its users, and its servers remain sufficiently independent during operation that no one entity or group of entities can unduly delay or "hang-up" the communications system or any of its major components. Each transmissions results in a termination of the transaction. Thus, there is no general purpose means to link data from one internet transaction to another, even though in certain specialized applications limited amounts of data may be coupled using "cookies" or via attaching data to a specific HTML screen.

However, some of the most powerful data base management functions or services of necessity rely on coupling data from one transaction to another in dialog fashion. In fact this linking is of the essence of MAPPER Runs which assume change of state from one command language statement to the next. True statelessness from a first MAPPER command to the next or subsequent MAPPER command would preclude much of the power of MAPPER (or any other modern data base management system) as a data base management tool and would eliminate data base management as we now know it.

SUMMARY OF THE INVENTION

The present invention overcomes the disadvantages of the prior art by providing a method of and apparatus for utilizing the power of a full featured data base management system by a user at a terminal coupled to the world wide web or internet while maintaining security. In order to permit any such access, the present invention must first provide an interface, herein referred to generically as a gateway, which translates transaction data transferred from the user over the internet in HTML format into a format from which data base management system commands and inputs may be generated. The gateway must also convert the data base management system responses and outputs for usage on the user's internet terminal. Thus, as a minimum, the gateway must make these format and protocol conversions. In the preferred embodiment, the gateway resides in the web server coupled to the user via the world wide web and coupled to proprietary data base management system.

To make access to a proprietary data base by internet users practical, a sophisticated security system is required to prevent intentional or inadvertent unauthorized access to the sensitive data of an organization. As discussed above, such a security system should provide multiple levels of access to accommodate a variety of authorized user categories. One type of prior art usage of the proprietary data base involves a security profile associated with a particular user site. This practice originally resulted from dedicated terminals operating in enterprise secure areas via dedicated data links. This site specific access is particularly effective when the function performed by the user takes precedence over the identity of the specific user.

Site specific security profiles tend to offer access to more sensitive data only if the user terminal site is physically secure. On the other hand, site specific profiles may offer only limited or no access to sensitive data when the user terminal site is not particularly secure. These features can be effectively combined with physical security procedures to provide many specialized security profiles. In the preferred embodiment of the present invention, site specific security profiles are implemented using a secret field, which identifies the user terminal site. This identifier is utilized by the Cool ICE system to define the appropriate level of site security for the transferring user terminal.

From the system perspective, rather than defining several levels of data classification, the different classes of users and user sites are managed by identifying a security profile as a portion of those service requests requiring access to secure data. Thus, the security profile accompanies the data/service to be accessed. The user simply need execute the sign on procedure which correlates to the access permitted. This permits certain levels of data to be accessed by one or more of the several classes of user.

In the preferred mode of practicing the present invention, a user signs on to the gateway with a generic login protocol providing access as an unsecured user. All users of the gateway sign on in a similar fashion. Should the user request access to a secure function or to secure data, the gateway, rather than the secure service, manages the security profiling technique. The service request for secure access results in the gateway requesting such additional logon information as is required to permit the desired access. In this way, the web browser request is associated with security attributes so that each web user transaction attaches to the database management system object using the security obtained from the Cool ICE session object.

Whereas the gateway and the security system are the minimum necessary to permit the most rudimentary form of communication between the internet terminal of the user and the proprietary data base management system, as explained above, the internet is a "stateless" communication system; the addition of the gateway and the security system do not change this statelessness. To unleash the real power of the data base management system, the communication protocol between the data base and the user requires functional interaction between the various data transfers.

The present invention adds security management and state management to this environment. Instead of considering each transfer from the internet user coupled with the corresponding server response as an isolated transaction event as defined by the world wide web, one or more related service requests may be functionally associated in a service request sequence as defined by the data base management system into a dialog.

A repository is established to store the state of the service request sequence. As such, the repository can store intermediate requests and responses, as well as other data associated with the service request sequence. Thus, the repository buffers commands, data, and intermediate products utilized in formatting subsequent data base management service requests and in formatting subsequent data to be available to the user's browser.

The transaction data in HTML format received by the server from the user, along with the state information stored in the repository, are processed by a service handler into a sequence of service requests in the command language of the data base management system.

Through the use of the repository to store the state of the service request sequence, the service handler to execute data base management commands, the world wide web user is capable of performing each and every data base management function available to any user, including a user from a proprietary terminal having a dedicated communication link which is co-located with the proprietary data base management system hardware and software. In addition, the data base management system user at the world wide web terminal is able to accomplish this without extensive training concerning the command language of the data base management system.

In accordance with the preferred mode of the present invention, a single service request from an internet terminal permits a user to upload and process a plurality of files. The transfer is initiated by the browser. Initial parsing of the service request causes the web application server service to define an appropriate number of temporary files. Each of the plurality of files is thus loaded into a separate one of he temporary files. The requested processing is accomplished permitting the system to delete the temporary files.

Form data was made available to the web application server service as binary data. Typically a web server application service needs to parse through the binary data to obtain the file upload information, and only then creates a single file on the web application server.

The present invention also parses through binary form data to create files on the web application server. However, the preferred mode provides the additional values:

1. It provides automatic processing of browser file upload for any web application service requested. The invention always processes forms with file upload specification and then creates a Scripting.Dictionary object to map form data to keys and values in the form. The dictionary is then processed to pass specific form information to a web service.

2. It provides generic processing of form data, so that any service can process the form. Form data is supplied in a Scripting.Dictionary object that:

maps the name of the form field to the name of the file uploaded from the browser client.

maps the name of the form field to a temporary server file which contains the uploaded file.

provides other form field s as key/value pairs in the dictionary.

automatically deletes the temporary server files when the web service completes.

The value added frees the web application developer from having to process the binary form data, since the invention automatically supplied the form data as parameters and uploaded the files to the web application server service.

This feature of Cool ICE has the ability to process multiple file upload requests from a world wide web browser with enctype="multipart/form-data. The algorithm parses through the form, and for each file upload request, calls a web application server service to generate a temporary file. Another user-defined web application server service is then invoked with variables indicating file information that can be processed.

Web browsers can upload files from a client machine to a host machine using a Form specified with an ENCTYPE= "multipart/form-data" specification on the form. Such a form may be specified with multiple upload files and report fields.

This invention solves ,the problem of how a web application developer can build a random form specifying multiple file upload fields, and then have the form data supplied to a service on the web application server.

A mechanism is provided to process the raw form data so that file data is uploaded into temporary files on the web application server. A requested web application server service is supplied with all information about the form including the location of temporary files and other form fields values. When the web application server service finishes executing, the temporary files are automatically deleted.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 13 is an ordered listing of the get engine messages; and

FIG. 14 shows the format for a multiple file transfer.

DETAILED DESCRIPTION OF THE PREFERRED EMBODIMENTS

The present invention is described in accordance with several preferred embodiments which are to be viewed as illustrative without being limiting. These several preferred embodiments are based upon the MAPPER data base management system, and the Cool ICE software components, all available from Unisys Corporation.

Figure 1:
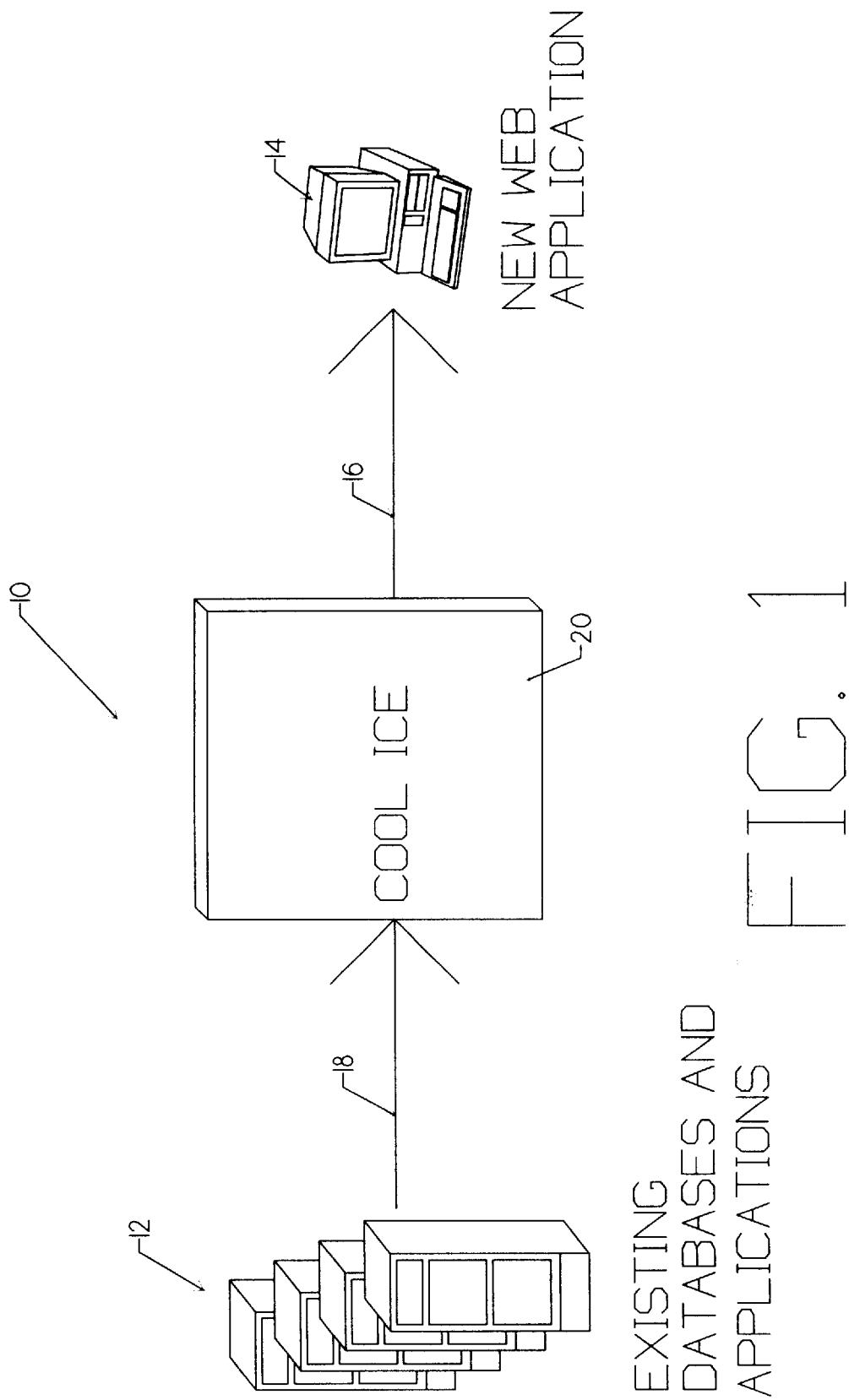
FIG. 1 is pictographic view of the Cool ICE system coupled between a user on the world wide web and an existing proprietary data base management system.

FIG. 1 is an overall pictographic representation of a system 10 permitting access to a proprietary data base management system via an internet terminal. Existing data bases and applications 12 represents commercially available hardware and software systems which typically provide select users with access to proprietary data and data base management functions. In the preferred embodiment, existing data bases and applications 12 represents one or more data bases prepared using MAPPER data base management system, all available from Unisys Corporation. Historically, existing data bases and applications 12 could only be accessed from a dedicated, direct terminal link, either physically co-located with the other system elements or connected thereto via a secured dedicated link.

With the preferred mode of the present invention, communication between new web application terminal 14 and existing data bases and applications 12 is facilitated. As discussed above, this permits nearly universal access by users world wide without specialized hardware and/or user training. The user effects the access using standardized HTML transaction language through world wide web link 16 to the Cool ICE system 20, which serves as a world wide web server to world wide web link 16.

Cool ICE system 20 appears to existing data bases and applications 12 as a data base management system proprietary user terminal over dedicated link 18. Oftentimes, dedicated link 18 is an intranet or other localized link. Cool ICE system 20 is currently available in commercial form without the present invention as Cool ICE Revision Level 1.1 from Unisys Corporation.

Figure 2:
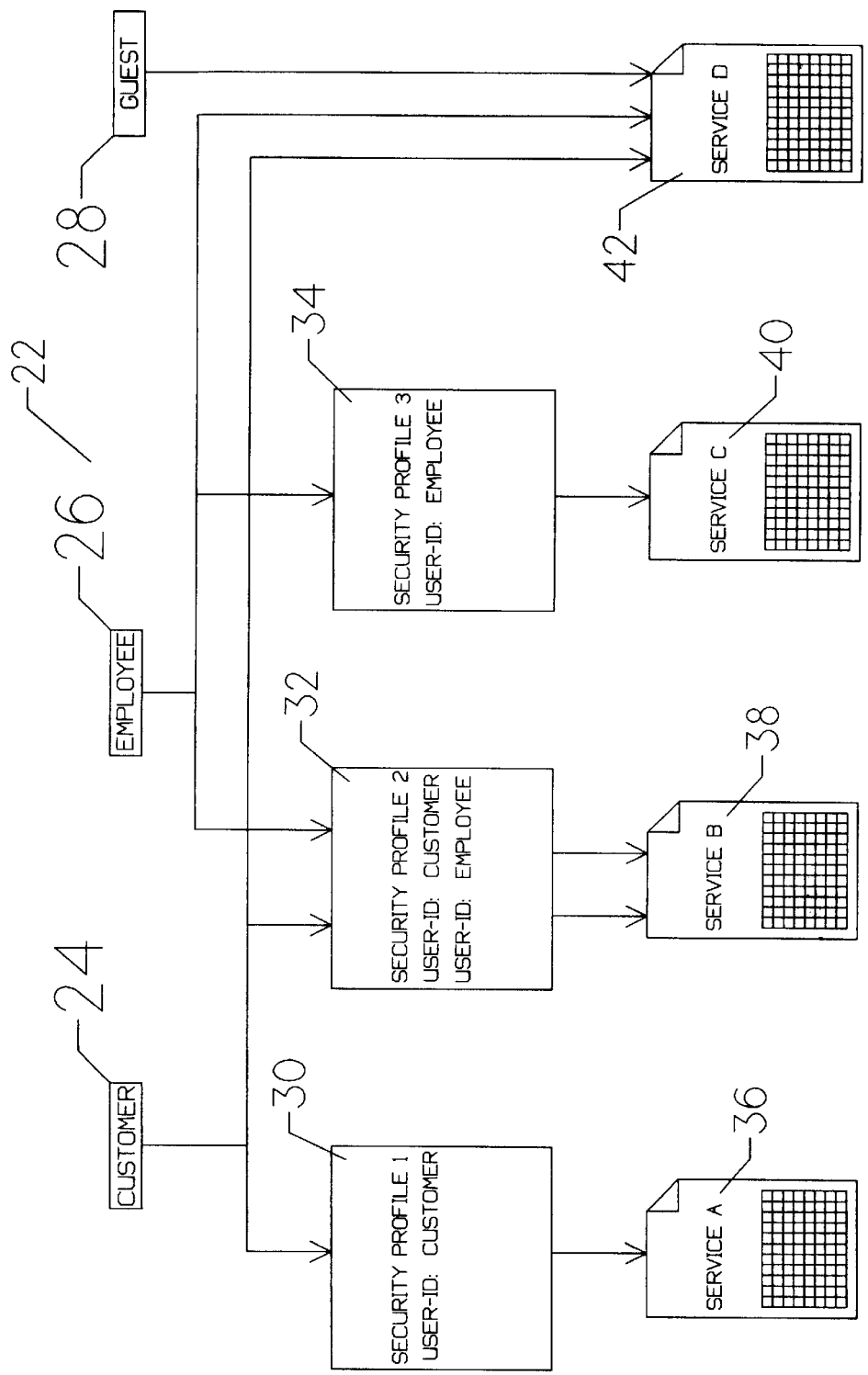
FIG. 2 is a schematic drawing showing the operation of a multi-level security system in accordance with the preferred embodiment of the present invention.

FIG. 2 is a basic schematic diagram of security system 22 of the preferred mode of the present invention. By way of example, there are four categories of service defined, each with its own functionality and portion of the data base. Service A 36 contains data and functions which should only be made available to customers. Service B 38 contains data and functions which should only be made available to customers or employees. Service C 40 contains data and functions which should only be made available to employees, and Service D 42, containing the least restrictive data and functions may be made available to anyone, including the general public.

In a typical application, Service D 42 might contain the general home page information of the enterprise. It will consist of only the most public of information. It is likely to include the name, address, e-mail address, and phone number of the enterprise, along with the most public of the business details. Usually, Service D 42 would include means of presenting the information in a sufficiently interesting way to entice the most casual of the public user to make further inquiry and thus become more involved with the objectives of the enterprise. Service D 42 represents the lowest level of security with data and functions available to all.

Service C 40 is potentially the highest level of classification. It contains data and functions which can be made available only to employees. In actual practice, this might entail a number of sub levels corresponding to the various levels of authority of the various employees. However, some services may be so sensitive that the enterprise decides not to provide any access via the internet. This might include such things as strategic planning data and tools, advanced financial predictions, specific information regarding individual employees, marketing plans, etc. The penalty for this extreme security measure is that even authorized individuals are prohibited from accessing these services via the internet, and they must take the trouble to achieve access via an old-fashioned dedicated link.

Customers and employees may share access to Service B 38. Nevertheless, these data and functions are sufficiently sensitive that they are not made public. Service B 38 likely provides access to product specifications, delivery schedules and quantities, and pricing.

For customer access only is Service A 36. One would expect marketing information, along with specific account information, to be available here.

These four service levels (i.e., Service A 36, Service B 38, Service C 40, and Service D 42) are regulated in accordance with three security profiles. The lowest level of security does not require a security profile, because any member of the general public may be granted access. This can be readily seen as guest category 28 (e.g., a member of the public) can directly access Service D 42. Of course, all other categories of user may also directly access Service D 42, because all members of the more restrictive categories (e.g., customers and employees) are also members of the general public (i.e., the least restrictive category).

Security Profile #1, 30 permits access to Service A-36 if and only if the requestor seeking access is a customer and therefore a member of customer category 24. Members of customer category 24 need to identify themselves with a customer identification code in order to gain access. The assigning and processing of such identification codes are well known to those of skill in the art.

Similarly, Security Profile #3, 34 permits access to Service C 40 if and only if the requestor seeking access is an employee and therefore a member of employee category 26. Security Profile #2, 32 permits access to Service B 38 to requestors from either customer category 24 or employee category 26, upon receipt of a customer identification code or an employee identification code. A more detailed description of the security system of the preferred mode of the present invention is found below.

Figure 3:
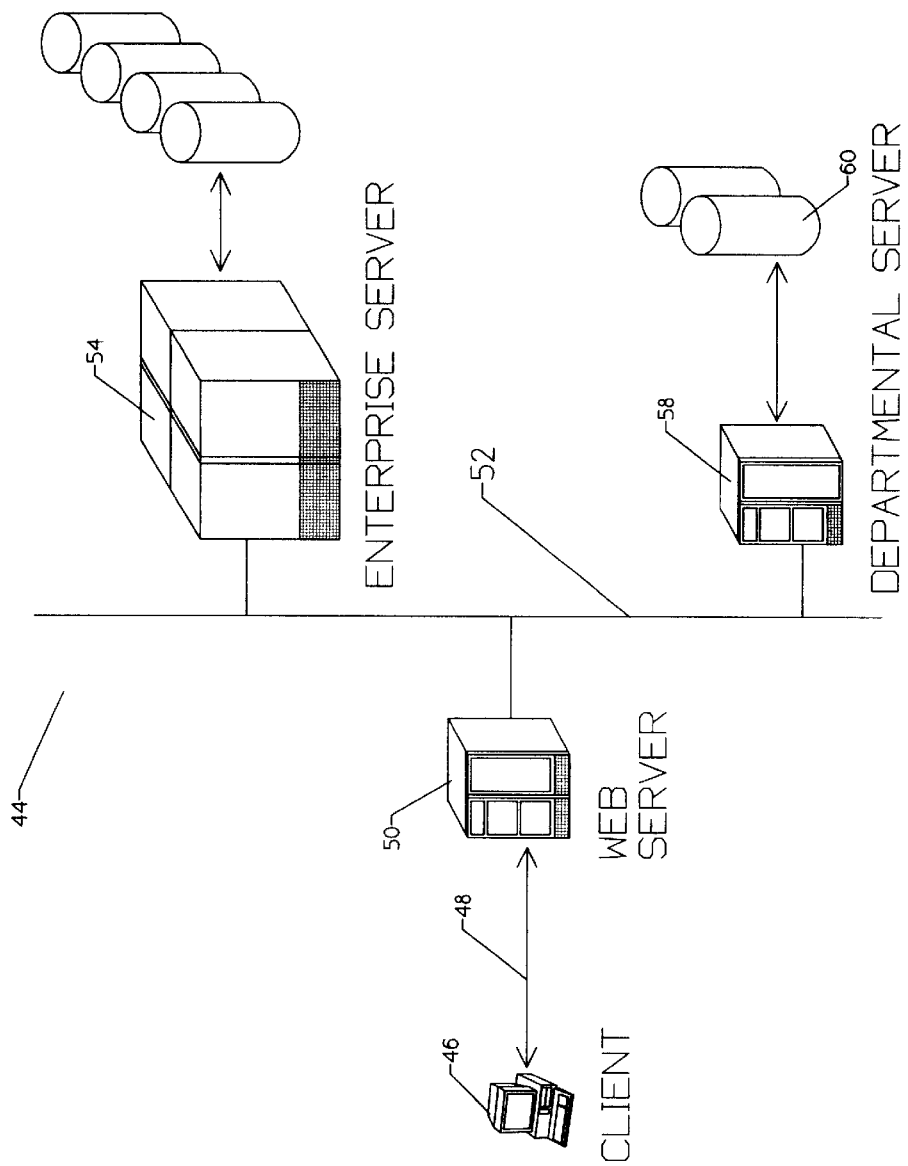
FIG. 3 is a pictographic view of the hardware of the preferred embodiment.

FIG. 3 is a pictorial diagram of hardware suite 44 of the preferred embodiment of the present invention. The client interfaces with the system via internet terminal 46. Terminal 46 is an industry compatible, personalized computer having a suitable web browser, all being readily available commercial products. Internet terminal 46 communicates over world wide web access 48 using standardized HTML protocol.

The Cool ICE system is resident in web server 50, which is coupled to internet terminal 46 via world wide web access 48. In the preferred mode, web server 50 is owned and operated by the enterprise owning and controlling the proprietary data base management system. Web server 50 may serve as the internet access provider for internet terminal 46. Web server 50 may be a remote server site on the internet if the shown client has a different internet access provider. This would ordinarily occur if the shown client were a customer or guest.

In addition to being coupled to world wide web access 48, web server 50, containing the Cool ICE system, can be coupled to network 52 of the enterprise as shown. Network 52 provides the system with communication for additional enterprise business purposes. Thus, the Cool ICE application on web server 50 and others granted access may communicate via network 52 within the physical security provided by the enterprise. Also coupled to network 52 is departmental server 58 having departmental server storage facility 60. Additional departmental servers (not shown) may be coupled to network 52. The enterprise data and enterprise data base management service functionality typically resides within enterprise server 54, departmental server 58, and any other departmental servers (not shown). Normal operation in accordance with the prior art would provide access to this data and data base management functionality via network 52 to users directly coupled to network 52.

In the preferred mode of the present invention, access to this data and data base management functionality is also provided to users (e.g., internet terminal 46) not directly coupled to network 52, but indirectly coupled to network 52 via web server 50 and the Cool ICE server application components. As explained below in more detail, web server 50 provides this access utilizing the Cool ICE system resident in web server 50.

Figure 4:
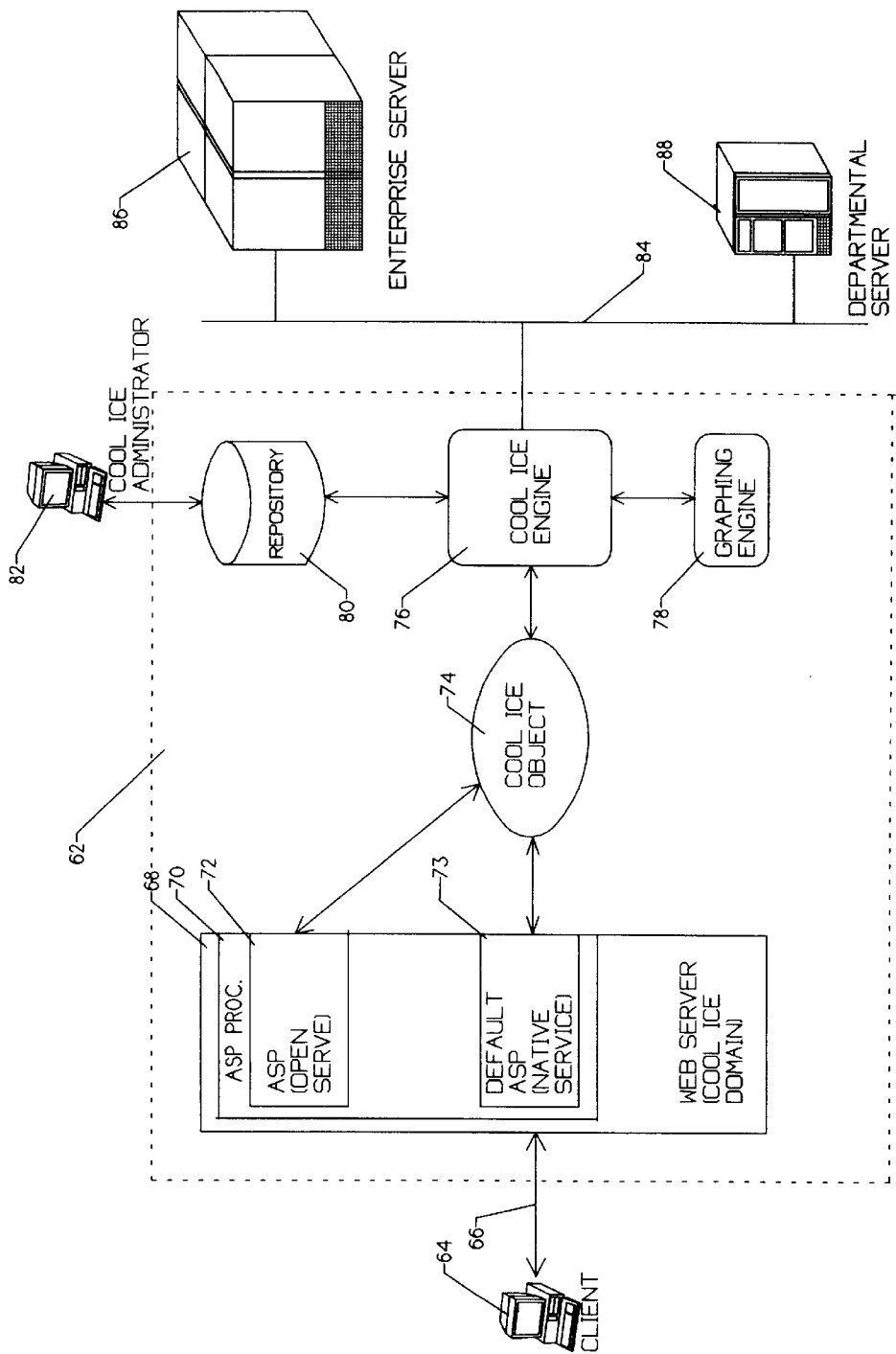
FIG. 4 is a semi-schematic diagram of the operation of the Cool ICE system.

FIG. 4 is pictographic view of the system of FIG. 3 with particular detail showing the organization and operation of the Cool ICE system 62, which is resident in the web server (see also FIG. 3). In this view, the client accesses the data base management system within the enterprise via internet terminal 54 which is coupled to the web server 68 by world wide web path 66. Again, the internet terminal 54 is preferably an industry standard computer utilizing a commercially available web browser.

The basic request/response format of the Cool ICE system involves a "service" (defined in greater detail below) which is an object of the Cool ICE system. The service is a predefined operation or related sequence of operations which provide the client with a desired static or dynamic result. The services are categorized by the language in which they were developed. Whereas all services are developed with client-side scripting which is compatible with internet terminal 54 (e.g., HTML), the server-side scripting defines the service category. Native services utilize Cool ICE script for all server-side scripting. On the other hand, open services may have server-side scripting in a variety of common commercial languages including Jscript, VBScript, ActiveX controls, and HTML. Because native services are developed in the Cool ICE script (run) language, greater development flexibility and variety are available with this technique.

Web server 68 provides processor 70 for Active Server Pages (ASP's) which have been developed as open services 72 and a Default ASP 73 for invoking native services. After the appropriate decoding within a native or open service, a call to the necessary Cool ICE object 74 is initiated as shown. The selected service is processed by the Cool ICE engine 76.

Repository 80 is a storage resource for long term storage of the Cool ICE service scripts and short term storage of the state of a particular service. Further details concerning repository 80 may be found by consulting the above referenced, commonly-assigned, co-pending U.S. Patent Application. In the preferred mode of the present invention, the service scripts stored in repository 80 are typically very similar to mapper runs as described above. For a more detailed description of MAPPER runs, MAPPER User Manual is available from Unisys Corporation and incorporated herein by reference.

Cool ICE engine 76 sequences these previously stored command statements and can use them to communicate via network 84 with other data base management system(s) (e.g., MAPPER) resident on enterprise server 86 and/OR departmental server 88. The storage capability of repository 80 is utilized by Cool ICE engine 76 to store the state and intermediate products of each service until the processing sequence has been completed. Following completion, Cool ICE engine 76 retrieves the intermediate products from repository 80 and formats the output response to the client, which is transferred to internet terminal 54 via web server 68 and world wide web path 66.

Cool ICE Administrator 82 is available for coordination of the operation of Cool ICE system 62 and thus can resolve conflicts, set run-time priorities, deal with security issues, and serve as a developmental resource. Graphing engine 78 is available to efficiently provide graphical representations of data to be a part of the response of a service. This tends to be a particularly useful utility, because many of the existing data base management systems have relatively sparse resources for graphical presentation of data.

The combination of Cool ICE object 74, Cool ICE engine 76, and repository 80 permits a rather simplistic service request from internet terminal 54 in dialog format to initiate a rather complex series of data base management system functions. In doing so, Cool ICE engine 76 emulates an intranet user of the data base management system(s) resident on enterprise server 86 and/or departmental server 88. This emulation is only made possible, because repository 80 stores sequences of command language statements (i.e., the logic of the service request) and intermediate products (i.e., the state of the service request). It is these functions which are not available in ordinary dialog on the world wide web and are therefore not even defined in that environment.

Figure 5:
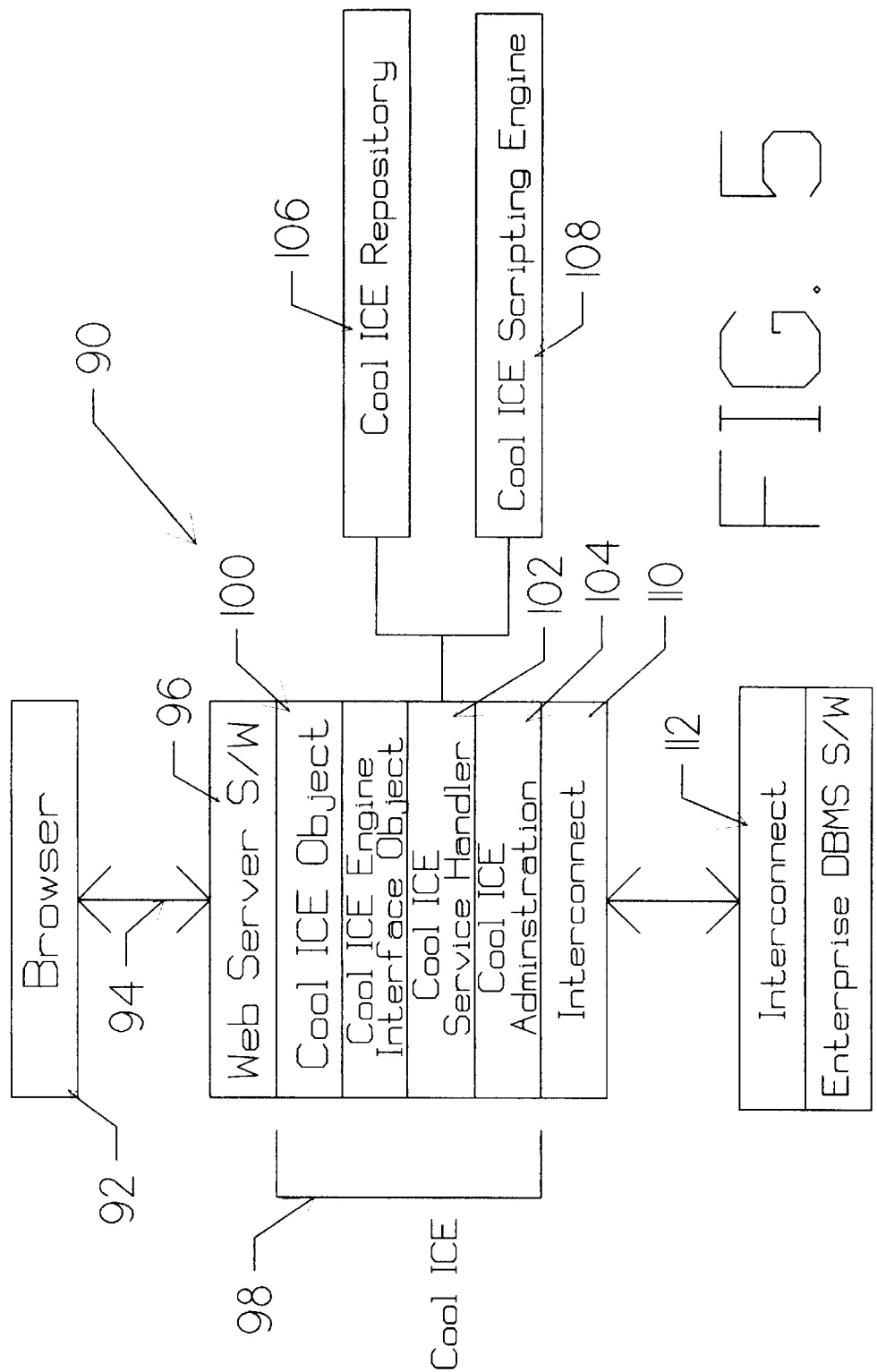
FIG. 5 is an overall schematic view of the software of the Cool ICE system.

FIG. 5 is a schematic diagram 90 of the software components of the Cool ICE system and the software components to which it interfaces in the preferred mode of the present invention. The client user of the Cool ICE system interfaces directly with web browser 92 which is resident on internet terminal 54 (see also FIG. 4). Web browser 92 is a commercially available browser. The only special requirement of web browser 92 is that it be capable of supporting frames.

Web browser 92 communicates with web server software 96 via internet standard protocol using HTNML language using world wide web path 94. Web server software 96 is also commercially available software, which is, of course, appropriate for to the web server host hardware configuration. In the preferred mode of the present invention, web server software 96 is hosted on Windows IIS- based server available from Microsoft Corporation.

Cool ICE system software 98 consists of Cool ICE Object (the gateway) 100, Cool ICE service handler 102, Cool ICE administration 104, Cool ICE repository 106, and Cool ICE Scripting Engine 108. It is these five software modules which establish and maintain an interface to web server software 96 using COM interfaces and interface to Cool ICE's internal and external data base management systems.

Cool ICE object 100 is the interface between standard, commercially available, web server software 96 and the internal Cool ICE system scripting engine with its language and logic facility. As such, Cool ICE object 100 translates the dialog format, incoming HTML service request into internal Cool ICE requests for service. Intrinsic in this translation is a determination of the service category (see also FIG. 4)—that is whether the service request is a native service (i.e., with a default Cool ICE server-side scripting) or an open service (i.e., with server-side scripting in another commercial language using the Cool ICEA object 100).

The service request, received from Cool ICE object 100, is utilized by Cool ICE service handler 102 to request the corresponding service action script from Cool ICE repository 106 and to open temporary state storage using Cool ICE repository 106. Cool ICE service handler 102 sequences through the service input variables of the object received from Cool ICE object 100 and transfers each to Cool ICE repository 106 for temporary storage until completion of the service request. Cool ICE service handler 102 retrieves the intermediate products from Cool ICE repository 106 upon completion of the service request and formulates the Cool ICE response for transfer to browser 92 via web server software 96 and world wide web path 94.

Cool ICE administration 104 implements automatic and manual control of the process. It provides for record keeping, for resolution of certain security issues, and for development of further Cool ICE objects. Interconnect I 10 and interconnect 1 12 are software interface modules for communicating over the enterprise network (see also FIG. 4). These modules are dependent upon the remaining proprietary hardware and software elements coupled to the enterprise network system. In the preferred mode of the present invention, these are commercially available from Unisys Corporation.

Figure 6:
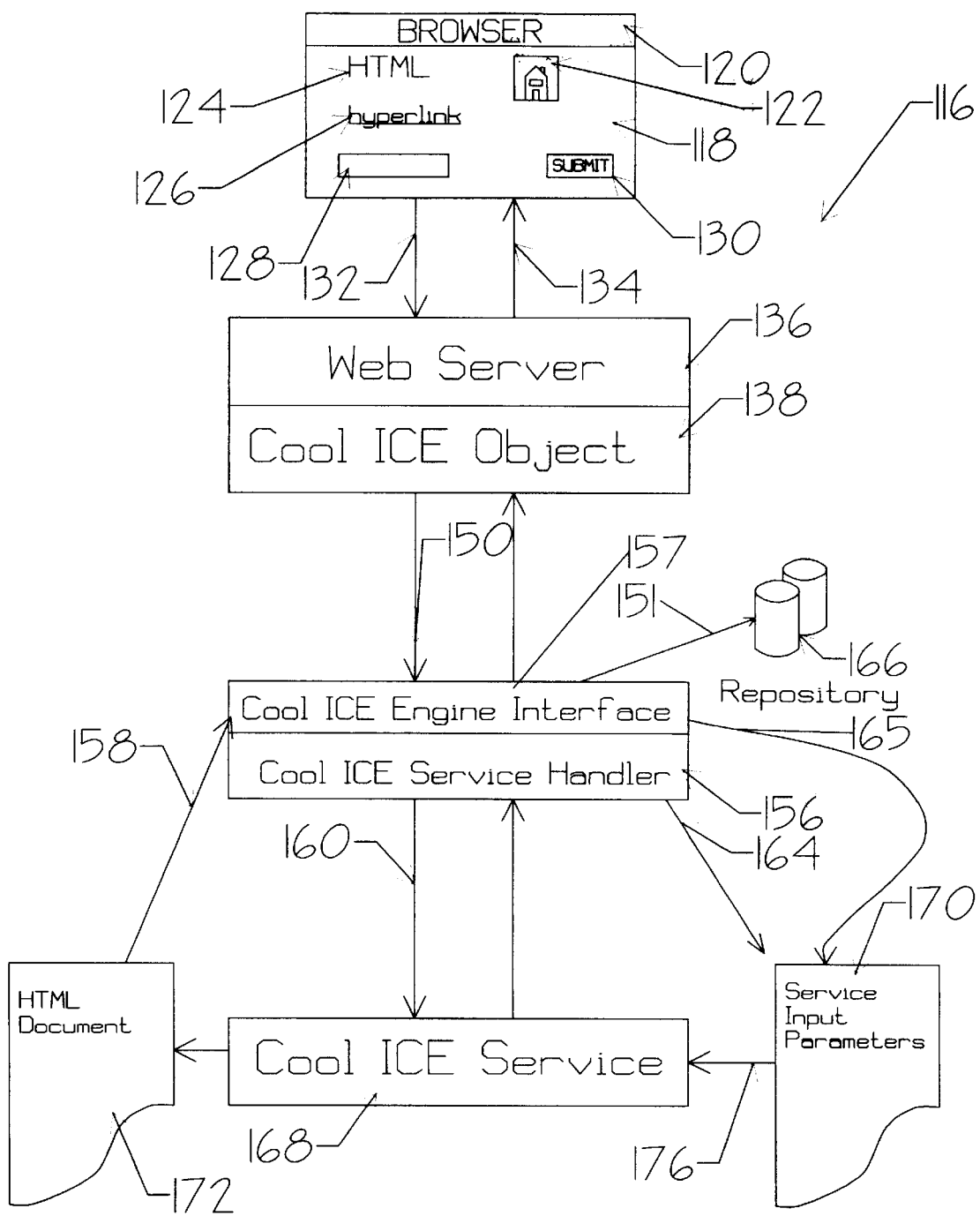
FIG. 6 is a schematic view of a service request.

FIG. 6 is a schematic diagram 116 showing the processing of a service request by the Cool ICE system. Screen 118 is the view as seen by the client or user at an internet terminal (see also FIG,. 4). This screen is produced by the commercially available browser 120 selected by the user. Any such industry standard browser is suitable, if it has the capability to handle frames. The language of screen 118 is HTML 124. Hyperlinks 126 is used in locating the URL of the-Cool ICE resident server. The components of the URL are as follows. In many instances, this will simply be the internet access provider of the internet terminal, as when the internet terminal is owned by the enterprise and the user is an employee. However, when the user is not an employee and the internet terminal is not necessarily owned by the enterprise, it becomes more likely that hyperlinks 126 identifies a remotely located server.

Icon 122 is a means of expressly identifying a particular service request. Such use of an icon is deemed to be unique. Additional detail concerning this use of an icon is available in the above identified, commonly assigned, co-pending U.S. Patent application. Window area 128 provides for the entry of any necessary or helpful input parameters. Not shown are possible prompts for entry of this data, which may be defined at the time of service request development. Submit button provides the user with a convenient means to transmit the service request to the web server in which the Cool ICE system is resident.

Upon "clicking on" submit button 130, screen 118 is transmitted to web server 136 via world wide web path 132. As discussed above, world wide web path 132 may be a telephonic dial-up of web server 136 or it might be a-long and complex path along the internet if web server 136 is remote from the originating internet terminal. Web server 136 is the software which performs the retrieval of screen 118 from world wide web path 132.

Screen 118 is transferred from web server 136 to Cool ICE object 138, wherein it is converted to the internal Cool ICE protocol and language. A browser input is opened at storage resource 166 via path 150 and path 151. Thus the initial service request can be accessed from storage resource 166 during processing up until the final result is transferred back to the user. This access readily permits multi-step and iterative service request processing, even though the service request was transferred as a single internet dialog element. This storage technique also provides initially received input parameters to later steps in the processing of the service request.

Cool ICE object 138 notifies Cool ICE service handler 156 through the Cool ICE Engine Interface 157 that a service request has been received and logged in. The service request itself is utilized by Cool ICE service handler 156 to retrieve a previously stored sequence of data base management system command statements from repository 166. Thus, in the general case, a single service request will result in the execution of a number of ordered data base management system commands. The exact sequence of these commands is defined by the service request developer as explained in more detail below.

Service input parameters 170 is prepared from the service request itself and from the command sequence stored in repository 166 as shown by paths 164 and 165. This list of input parameters is actually stored in a dedicated portion of repository 166 awaiting processing of the service request.

Each command statement from repository 166 identified with the service request object is sequentially presented to a Cool ICE service 168 for processing via path 160. The corresponding input parameters 170 is coupled with each command statement via path 176 to produce an appropriate action of the enterprise data base management system at Cool ICE service 168. After the enterprise data base management system has responded to a given query, the intermediate products are stored as entries in HTML document 172 which is also stored in a dedicated portion of repository 166.

After all command statements corresponding to the service request have been processed by the enterprise data base management system and HTML document 172 has been completed, the result is provided via path 158 to Cool ICE Engine Interface 157. Cool ICE object 138 receives the browser output via path 150. The response is converted to HTML protocol and transferred by web server 36 and world wide web path 134 to be presented to the user as a modified screen (not shown).

Figure 7:
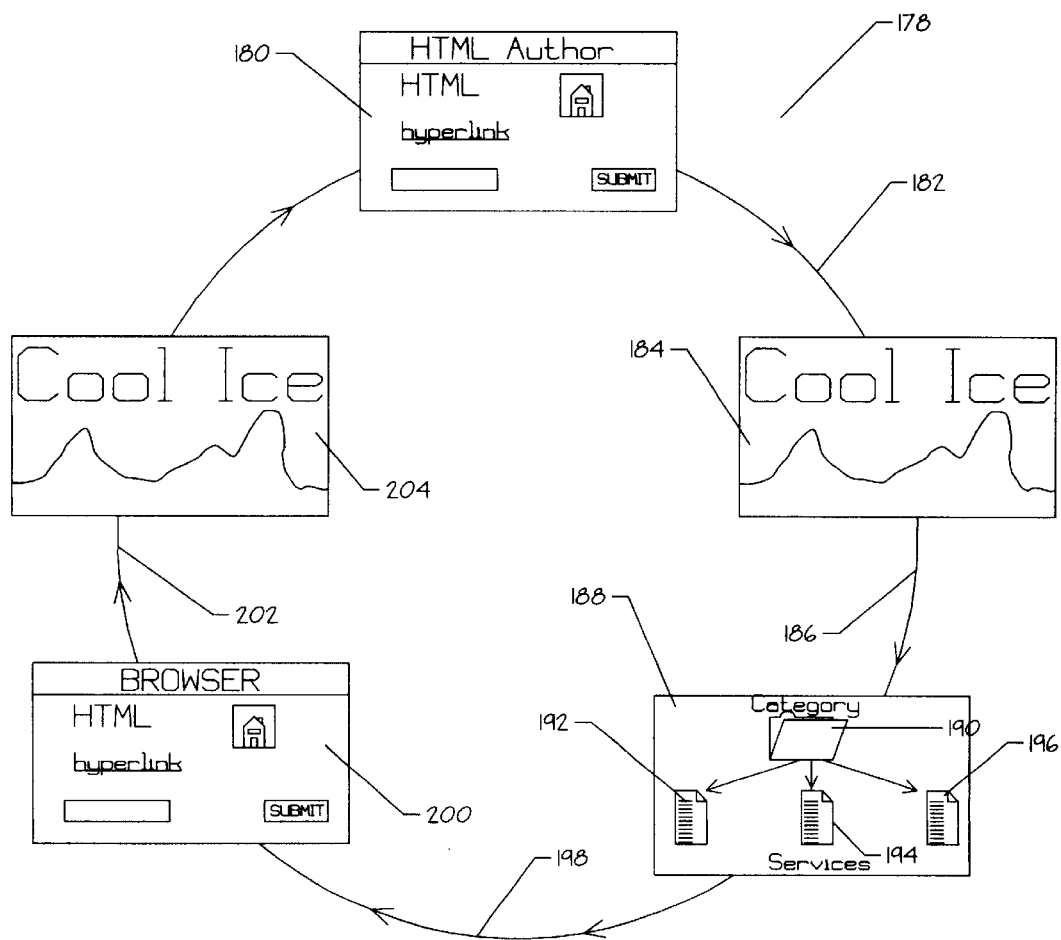
FIG. 7 shows a schematic view of a service request sequence.

FIG. 7 is a pictographic drawing 178 of the development process for creating a Cool ICE service. HTML document 180 is created utilizing any commercially available standard HTML authoring tool (e.g., Microsoft FrontPage). The resulting HTML document 180 is stored as a normal HTM file. This file will be utilized as a template of the service to be developed.

The authoring process moves along path 182 to invoke the administration module of the Cool ICE system at element 184. The new dynamic service is created using HTML document 180 stored as a normal HTM file as a template. As HTML document 180 is imported into Cool ICE, sequences of script for the beginning and end of the HTML code are automatically appended to the service. Required images, if any, are also uploaded onto the web server (see also FIGS. 5 and 6). The service is edited by inserting additional Cool ICE script, as required. A more detailed description of the editing process may be found in Cool ICE User's Guide, Revision 2.0, available from Unisys Corporation and incorporated herein by reference.

The completed service script is transferred along path 186 to element 188 for storage. The service is stored as a service object in the repository (see also FIGS. 5 and 6). Storage is effected within the appropriate category 190 as discussed above, along with services 192, 194, and 196 within the same category.

The process proceeds along path 198 to element 200 for testing. To perform the testing, the URL for the newly created service is entered into the browser of the internet terminal, if known. The typical URL is as follows:

http://machine-name/CoolICE/default.asp?Category=Examples&Service=FRMEX01

If the URL for the new service is not known, a list of the available services may be determined from the Cool ICE system by specifying the Cool ICE URL as follows:

http;:H/machine-name/Cool-ICE

This call will result in a presentation of a menu containing the defined categories. Selecting a category from the list will result in a menu for the services defined within that category. The desired service can thus be selected for testing. Selection of the service by either means will result in presentation of the HTML page as shown at element 200.

The process proceeds to element 204 via path 202, wherein the HTML page may be enhanced. This is accomplished by exporting the HTML document from the Cool ICE administration module to a directory for modification. By proceeding back to HTML document 180 via path 208, the exported HTML template is available for modification using a standard HTML authoring tool. After satisfactory completion, the finished HTML document is saved for future use.

Figure 8:
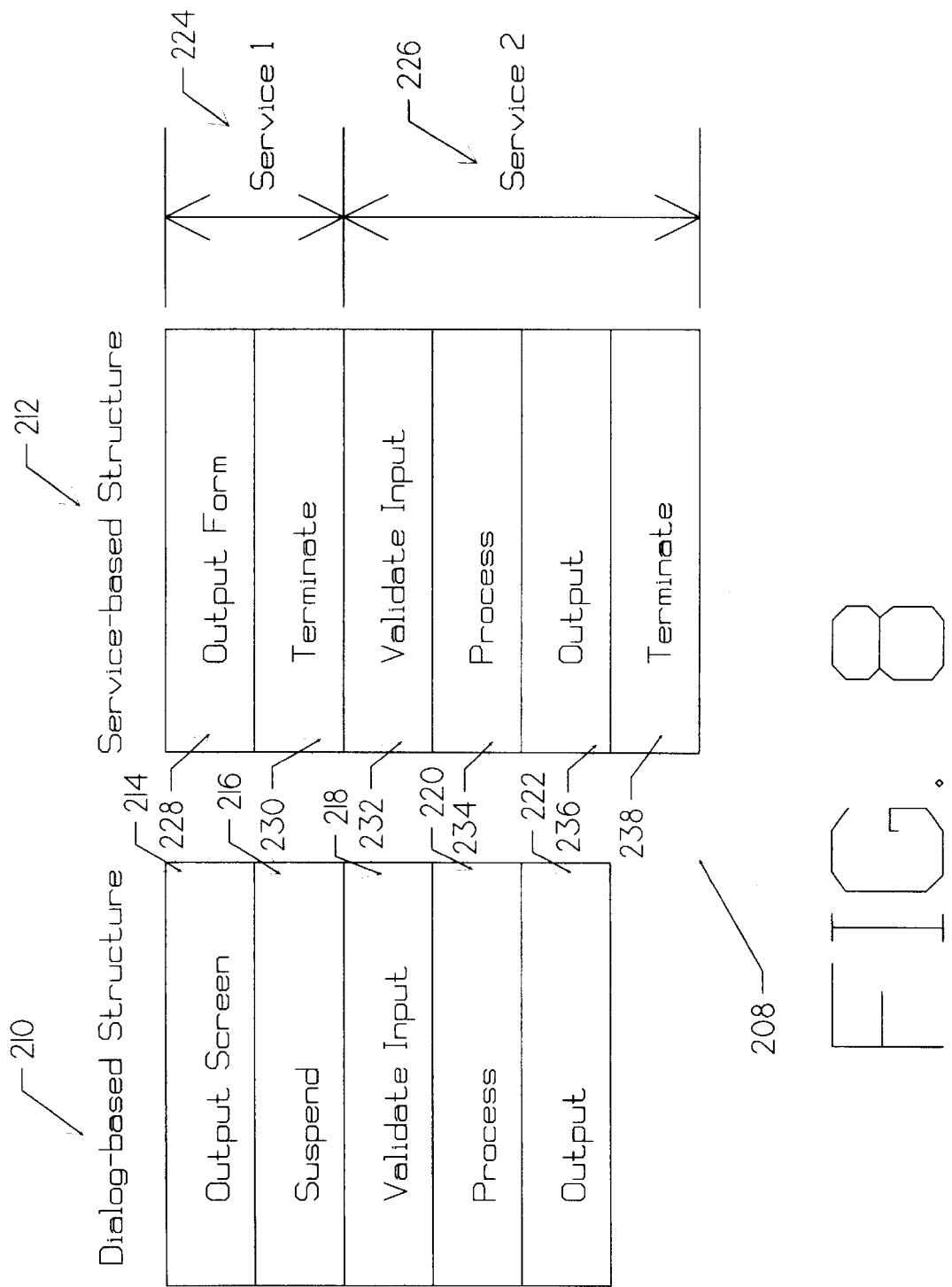
FIG. 8 is a diagrammatic comparison between a dialog-based structure and a service-based structure.

FIG. 8 is a diagram showing a comparison between dialog-based structure 210 and service-based structure 212. Dialog-based structure 210 is the norm for the typical existing proprietary data base management system (e.g., MAPPER). The user, normally sitting at a dedicated user terminal, transfers output screen 214 to the data base management system to request a service. The user terminal and its normally dedicated link are suspended at element 216 to permit transfer and operation of the data base management system. The input is validated at element 218, while the user terminal and its normally dedicated link remains suspended.

The data base management system processes the service request at element 220 while the user terminal remains suspended. Output occurs at element 222 thereby releasing the suspension of the user terminal. Thus, a true dialog is effected, because one part of the dialog pair (i.e., the user terminal) is suspended awaiting response from the data base management system. This type of dialog is best accomplished in an environment wherein at least the user terminal (or data base management system) is dedicated to the dialog, along with the link between user terminal and data base management system.

Service-based structure 212 illustrates one of the basic constraints of the world wide web protocol. To ensure that each of the elements on the world wide web are sufficiently independent and to prevent one element from unduly delaying or "hanging-up" another element to which it is coupled awaiting a response, the communication protocol forces a termination after each transmission. As can be readily seen, even the simplest dialog requires at least separate and independent transactions or services. The first service, Service 224, involves the transmissions of output form 228 from the internet user terminal. This transmission is immediately and automatically followed by termination 230 to ensure independence of the sender and receiver.

The second service, Service 226, enables the receiver of output form 228 to process the request and output an appropriate response. The validation of the input at element 232, processing 234, and output 236 all occur within the receiver of output form 228. Immediately and automatically, termination 238 follows. Thus, if internet transactions are to be linked into a true dialog to permit data base management functions, the state must be saved from one service to the next as taught herein.

In the preferred mode of the present invention, the state of a service is saved in the repository (see also FIGS. 4 and 5) for use in the next or subsequent services.

Figure 9:
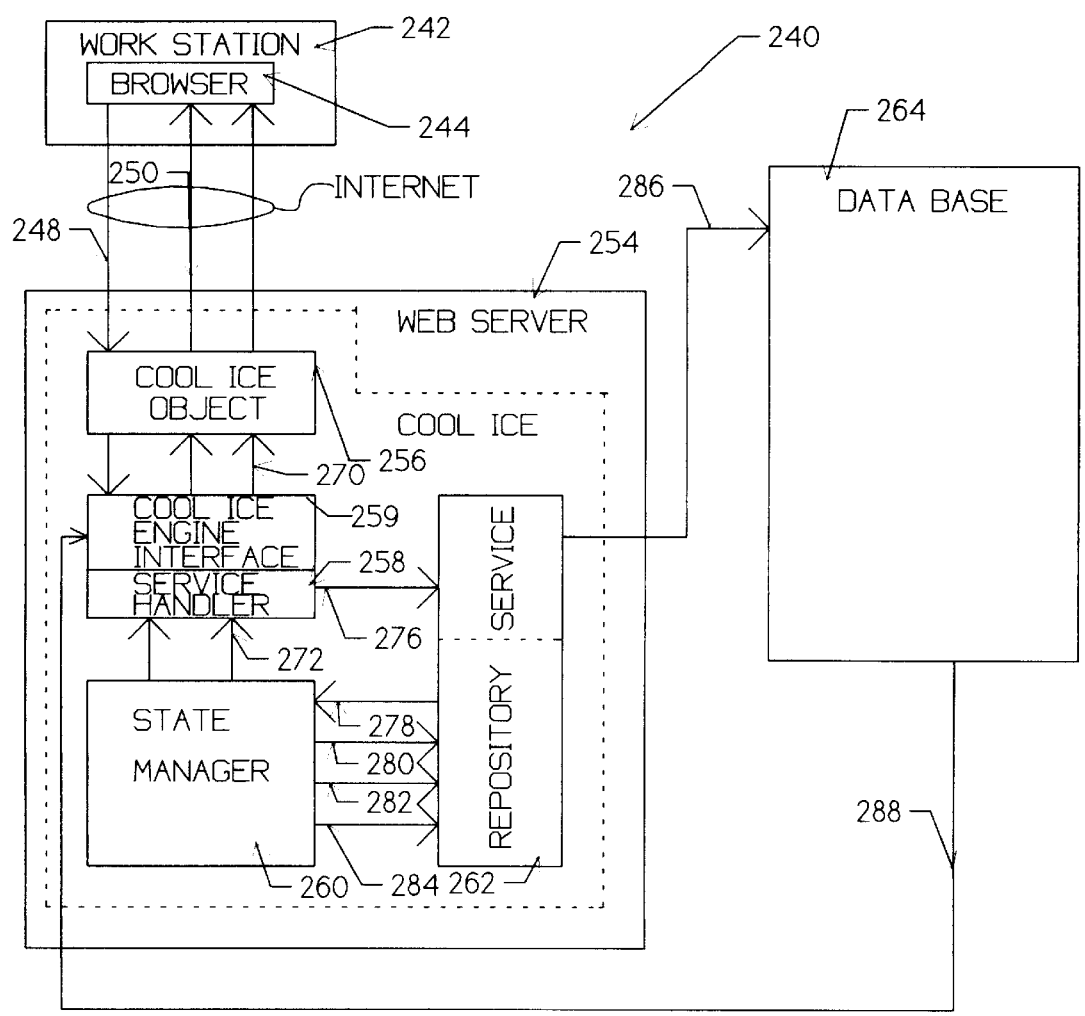
FIG. 9 is a detailed diagram of the storage and utilization of state information within the repository.

FIG. 9 is a schematic diagram 240 of the preferred mode of the present invention showing normal data flow during operation, with special attention to the state saving feature. Work station 242 is an industry compatible personal computer operating under a commonly available operating system. Browser 244 is a standard, commercially available web browser having frames capability. Path 248 is the normal world wide web path between work station 242 and web server 254 for the transfer of service requests and input data. These transfers are converted by Cool ICE object 256 as explained above and sent to Cool ICE Engine Interface 259 for disposition., The service request for data and/or another function is converted into the data base management language by reference to the service definition portion of repository 262 through reference along path 276. The actual command language of the data base management system is utilized over path 286 to access data base 264. The resultant data from data base 264 is transferred to Cool ICE object 256 via path 288. State manager 260 determines whether the original service request requires additional queries to data base 264 for completion of the dialog. If yes, the resultant data just received from data base 264 is transferred via path 284 to repository 262 for temporary storage, and the next query is initiated over path 286, and the process is repeated. This is the state saving pathway which is required to provide the user of the Cool ICE system to function in a dialog mode over the world wide web.

Upon receipt of the resultant data from the final query of data base 264, state manager 260 determines that the service request is now complete. State manager 260 notifies repository 262 via path 280, and the intermediate products are retrieved from temporary storage in repository 262 via path 278 and supplied to Cool ICE service handler 258 via path 272 for formatting. State manager 260 then clears the intermediate products from temporary storage in repository 262 via path 282. The final response to the service request is sent to Cool ICE object 256 via path 270 for manipulation, if necessary, and to browser 244 via path 250.

Figure 10:
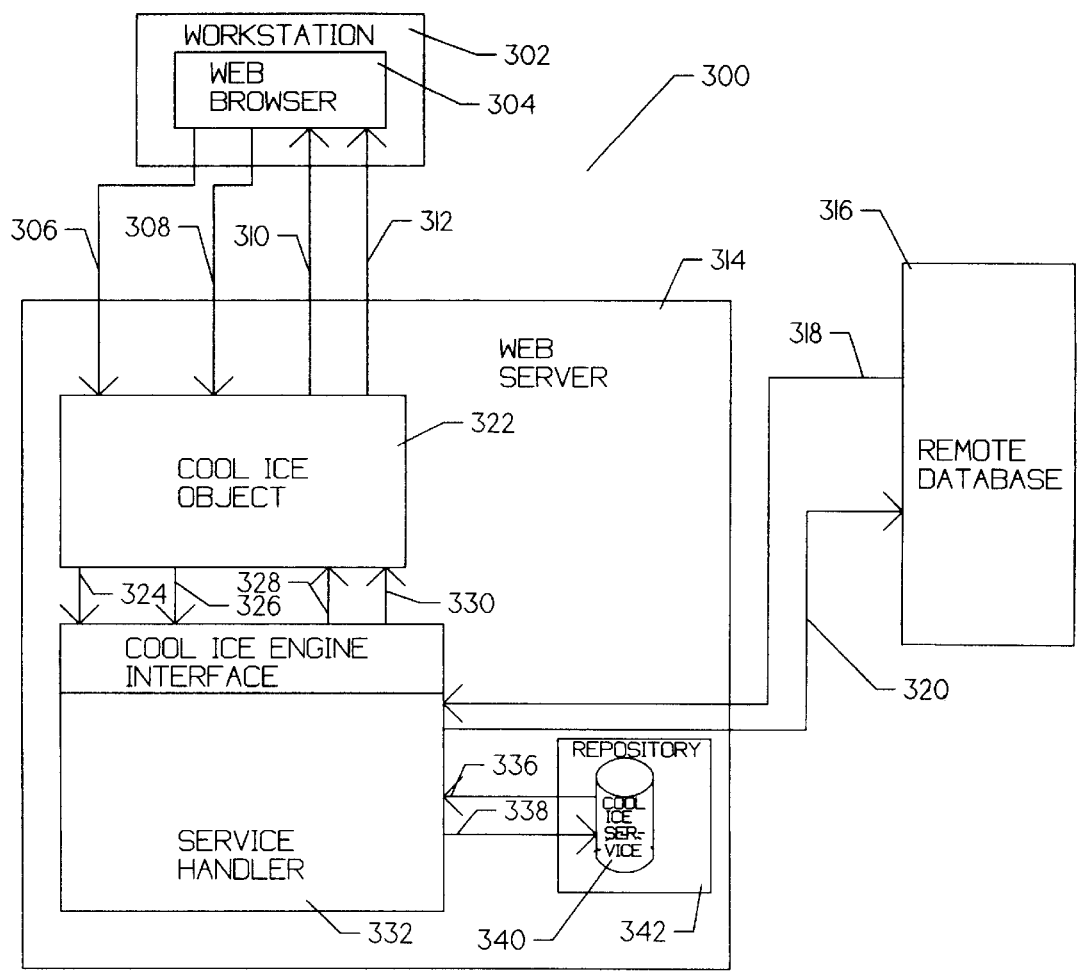
FIG. 10 is a detailed diagram showing security profile verification during a service request.

FIG. 10 is a detailed diagram 300 showing operation of the security system during the honoring of a service request. The user, operating industry compatible, personalized computer, workstation 302, formats a service requests via commercially available web browser 304. In the preferred mode of the present invention, this is accomplished by then making a call to the Cool ICE system. The user simply requests access to the Cool ICE home page by transferring web browser 304 to the URL of Cool ICE system. After the Cool ICE home page has been accessed, one of the buttons is clicked requesting a previously defined service request. For additional detail on the service request development process, see above and the above referenced commonly assigned, co-pending U.S. Patent Applications.

The service request is transferred to web server 314 via world wide web path 306. The service request is received by Cool ICE object 322 and translated for use within the Cool ICE system. The request is referred to the Cool ICE Engine Interface 331 via path 324. In the preferred mode of practicing the present invention, the Cool ICE Engine Interface 331 is equivalent to the MAPPER data base management system. The service request is passed to Cool ICE Service Handler 332 for retrieval of the command language script which describes the activities required of the data base management system to respond to the service request.

Cool ICE Service Handler 332 makes an access request of Cool ICE service portion 340 of repository 342 via path 338. It is within Cool ICE service portion 340 of repository 342 that the command language script corresponding to the service request is stored. The command language script is obtained and transferred via path 336 to service handler 332 for execution. Along with the command language script, a security profile, if any, is stored for the service request. As explained in the above referenced, commonly assigned, co-pending U.S. Patent Application, the security profile, if required, is added to the command language script file at the time of service request development by the service request developer. This security profile identifies which of the potential service requesters may actually be provided with a complete response. The security profile, if any, is similarly transferred to service handler 332 via path 336.

If no security profile has been identified for the service request, service handler 332 allows the execution of the command language script received via path 336 through access of remote database 316 via paths 318 and 320, as required. The response is transferred to Cool ICE object 322 via path 328 for conversion and transfer to workstation 302 via world wide web path 310.

However, if a security profile has been identified for the service request, service handler 322 requests the user to provide a user-id via path 330, Cool ICE object 322, and world wide web path 312. Service handler 332 awaits a response via world wide web path 308, Cool ICE object 322, and path 326. Service handler 332 compares the user-id received to the security profile stored with the command language script. If the user matches the security profile, access is granted and service handler 322 proceeds as described above. If the user does not match with the stored security profile, the service request is not executed and the user is notified via an appropriate message.

Figure 11:
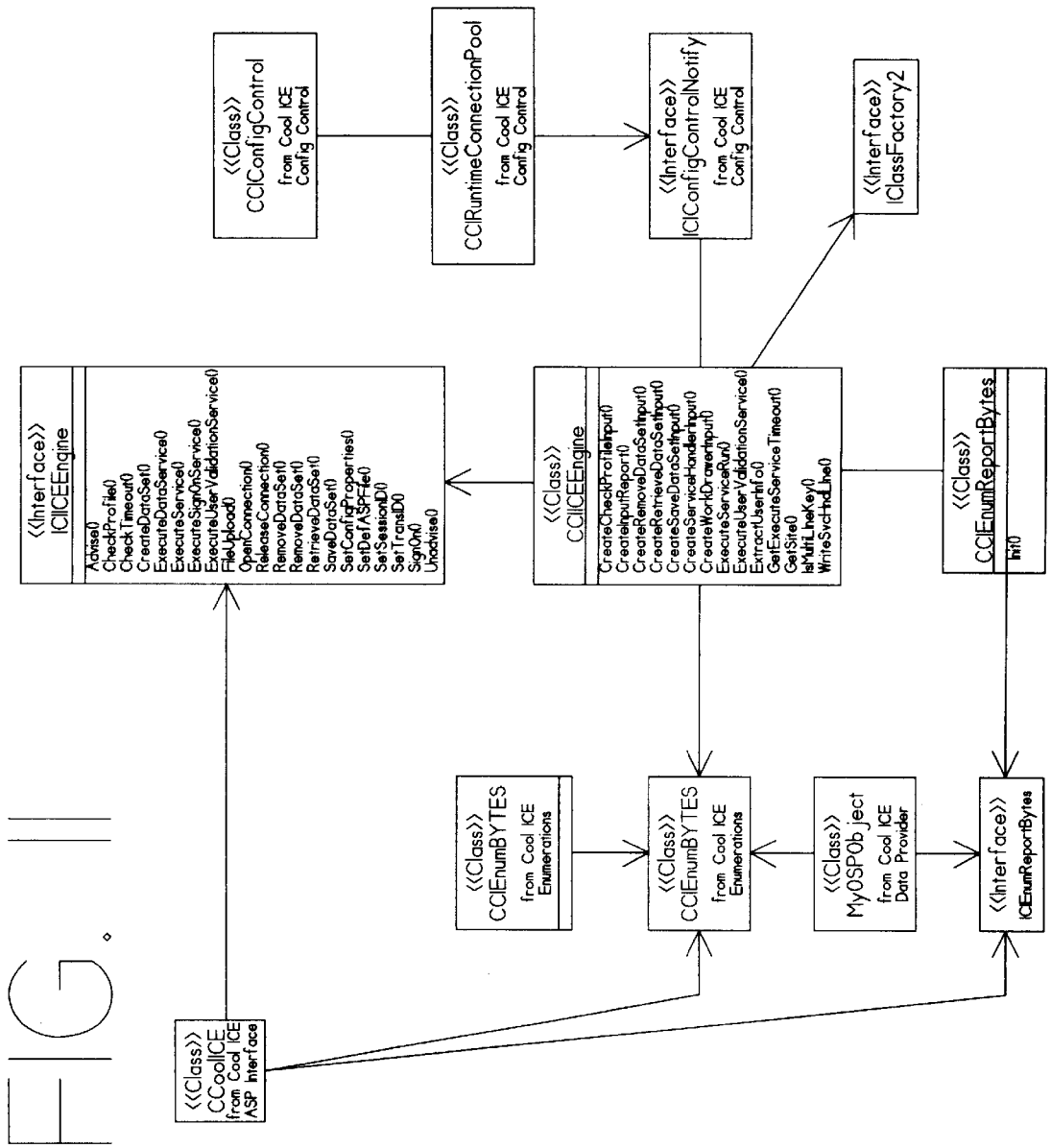
FIG. 11 is a Cool ICE engine class diagram.

FIG. 11 is an overall class diagram for the Cool ICE system engine. In practicing the present invention, the Cool ICE Engine utilizes the FileUpload facility shown. Because the multiple file upload is presented in a particular format, the engine can thus "unpack" the transfer without the need to analyze the entire data transfer at the binary level. When the multiple file upload service request is received, the individual files transferred are loaded into temporary files defined to honor the particular service request. After each of the uploaded files is processed, the temporary files are deleted.

Figure 12:
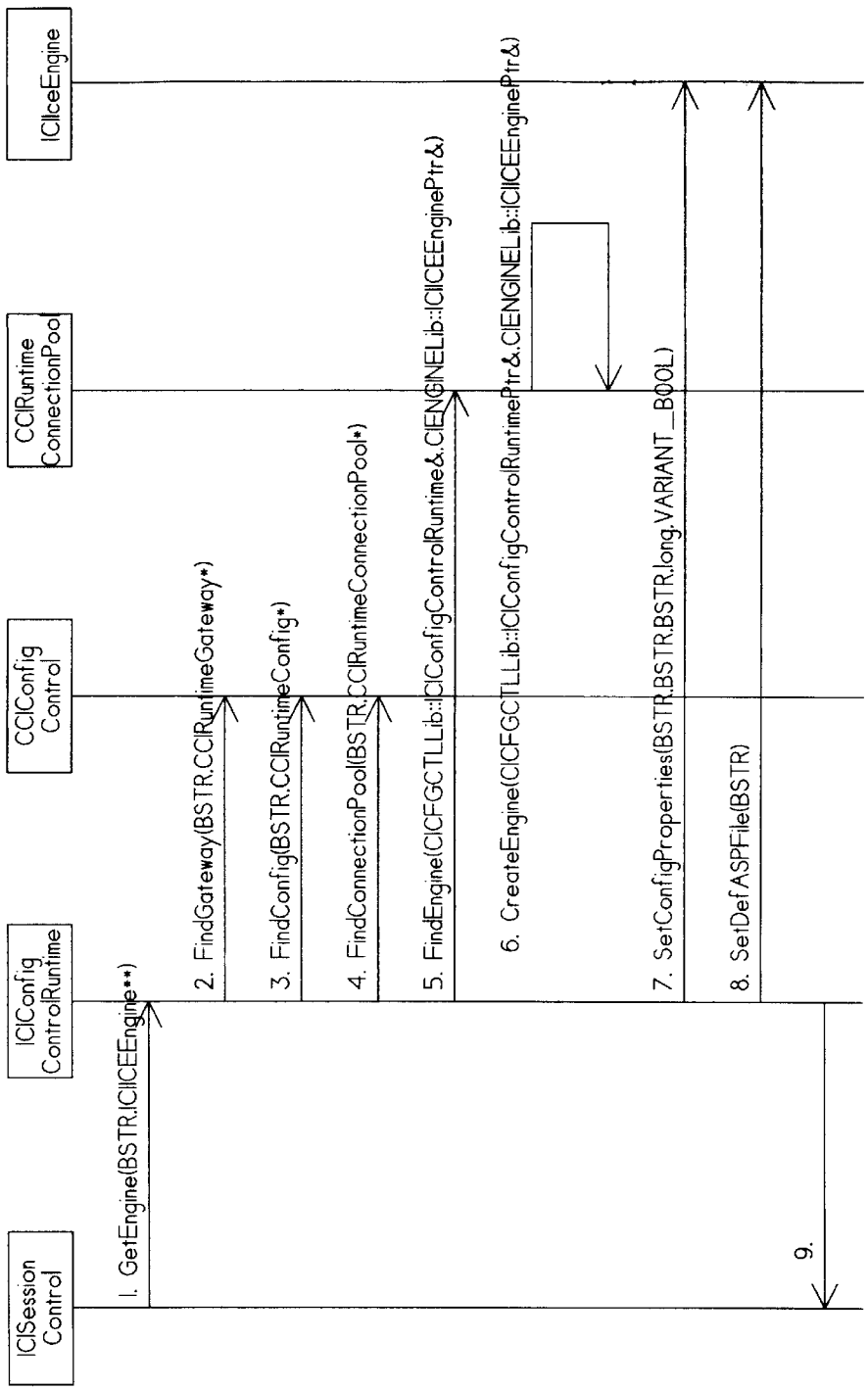
FIG. 12 is a get engine diagram.

FIG. 12 is a diagram showing the get engine operation.

FIG. 13 is an ordered listing of the messages associated with the get engine operation.

FIG. 14 shows an example of the raw data buffer format utilized for multiple file uploads. This invention includes a method that will process the raw data retrieved when a file upload has been performed. Since it is possible for multiple files to be uploaded at the same time, this method is able to handle an unknown number of files.

When a file upload has been performed, the Web Server variable HTTP_CONTENT_TYPE contains two pieces of information. The first part (multipart/form-data;) is the MIME type which indicates that a file upload has been performed. The second part (boundary= - - - 7ce14419205e0) defines a boundary separator. This value is at the beginning of each file, followed by some header information. The boundary value followed by two hyphens (-) is found at the ver end of the raw data buffer. This is used to indicate that there is no more data to process.

The Request.TotalBytes( ) method should be used to determine the number of bytes of data to be processed. This value includes the actual file data, all boundary separators, and header information. The Request.BinaryRead (BytesToRead) method is used to read the raw data. The raw data will consist of boundary separators, header information, and file data. FIG. 14 is an example of the raw data buffer.

This buffer contains data for two files. In this example, the beginning of the buffer contains a boundary separator. A <CR>/<LF>separator is used to indicate the end of a line. The first line of header information contains a Content-Disposition value that can be ignored, and a name value. The name value is the name of the input field in the form where a file name was entered. The second line of the header contains a filename value that is the name of the uploaded file. I fthe filename value is blank, this indicates that the-form was submitted without providing a file name. The third line of the header contains a Content-Type value. This value is the MIME type of the uploaded file. The fourth line of the header contains a <CR><LF>. The actual file data begins immediately following these two characters. At the end of the file data, a <CR><LF>will be found, followed by another boundary separator.

The final <CR><LF>characters should not be included as part of the file data. The file data may contain <CR><LF>characters to indicate the end of lines. Care must be taken to distinguish between <CR><LF>characters that are part of the file data, and those added as part of the file upload process.

This example contains data for a second uploaded file. The second boundary separator marks the end of the first file, and the beginning of the second file. The final boundary separator marks the end of the raw data. The final boundary separator will always be followed by two hyphens (-). This can be used to distinguish between the start of a new file, and the end of the raw data.

The first thing required is to read the raw data. To determine how much data to read, the Request.TotalBytes( ) method is called. This value should be passed as input to Request.BinaryRead(BytesToRead), which will read the data, and return a pointer to a SAFEARRAY of characters.

The boundary separator value must be retrieved from the Server Variable HTTP_CONTENT_TYPE. The value of this variable has the following format:

multipart/form-data; boundary= - - - 7ce14419205e0
Everything following the boundary= is the value of the boundary spearator.

This method will create a Scripting.Dictionary object which will contain various information about the uploaded files. For each uploaded file, the name value found in the second header line will be a key stored in the Scripting.Dictionary object. The value of the key is the filename value found in the third header line. Another key stored in the Scripting.Dicitionary object is derived from the name value found in the second header line. A 'F-' is appended to the beginning of the name value. For example, if name= "MyFile", then the key F-MyFile would be added to the Scripting.Dictionary object. The value of this key is full path name of a temporary file created by call ICIICEEngine::FileUpload.

After processing the header information for a file, the file data must be copied to a separate buffer. A buffer should be allocated using CoTaskMemAlloc, which is large enough to hold the file data. Next, A ICIEnumBytes object should be constructed, and initialized to point at the buffer which contains the file data. The ICEEnumBytes object is passed as input to ICIICEEngine::FileUpload.

The ICIICEEngine::FileUpload method is called to create a temporary file, and to write the uploaded file data into the temporary file. The ICIICEEngine::FileUpload method will return the full path name of the temporary file.

The processing of the file header lines and calling ICIICEEngine continues until the final boundary separator has been found. After all files have been processed, this method will return a pointer to the Scripting.Dictionary object.

The scripting dictionary object is then used to generate parameters to the web service, which uses the uploaded temporary file(s) to perform its work. When the service completes, the temporary file(s) are deleted.

Having thus described the preferred embodiments of the present invention, those of skill in the art will be readily able to adapt the teachings found herein to yet other embodiments within the scope of the claims hereto attached.

We claim:

1. In a data processing environment having a user terminal responsively coupled via a publicly accessible digital data communication network to a data base management system having at least one data base, the improvement comprising:
 (a). a facility responsively coupled to said data base management system which permits said user terminal to communicate with said data base management system in dialog fashion;
 (b). a single service request generated by said user terminal which uploads a plurality of files to said data base management system and requests processing of each individual one of said plurality of files using said facility;
 (c). a plurality of temporary files located within said data base management system which are created to temporarily store said plurality of files;
 (d). an engine located within said data base management system which unpacks said plurality of files and loads each individual one of said plurality of files into a different one of said plurality of temporary files; and
 (e). wherein said plurality of temporary files is deleted upon processing of said each individual file of said plurality of files.

2. The improvement according to claim 1 wherein said engine processes each of said plurality of files in response to receipt of said single service request.

3. The improvement according to claim 2 further comprising a service located within said data base management system which processes each of said plurality of files in response to receipt of said single service request.

4. The improvement according to claim 3 wherein said publically accessible digital data communication network further comprises the internet.

5. The improvement according to claim 4 wherein said data base management system is MAPPER.

6. An apparatus comprising:
 (a). a user terminal;
 (b). a data base management system having access to a data base responsively coupled to said user terminal via a publicly accessible digital data communication network; and
 (c). a service request generated by said user terminal which uploads a plurality of files to said data base management system and causes said data base management system to process each of said plurality of files.

7. The apparatus of claim 6 wherein said data base management system processes each of said plurality of files upon receipt of said service request.

8. The apparatus of claim 7 wherein said data base management system creates a different temporary storage buffer for each of said plurality of files upon receipt of said service request.

9. The apparatus of claim 8 wherein said data base management system further comprises MAPPER.

10. The apparatus of claim 9 wherein said publicly accessible digital data communication network further comprises the world wide web.

11. A method of utilizing a user terminal to access a remote data base management system having a data base via a publicly accessible digital data communication network comprising:
 (a). transmitting a service request requesting upload of a plurality of files from said user terminal;
 (b). receiving said service request by said remote data base management system;
 (c). uploading each of said plurality of files by said remote data base management system in response to said service request;
 (d). storing each of said plurality of files into a different one of a plurality of temporary files;
 (e). processing each of said plurality of files by said data base management system; and
 (f). deleting each of said plurality of temporary files following processing of each of said plurality of files.

12. A method according to claim 11 wherein said processing step further comprises activating an engine and executing said processing step by said engine.

13. A method according to claim 12 wherein said storing step is performed by said engine.

14. A method according to claim 13 wherein said publically accessible digital data communication network further comprises the internet.

15. A method according to claim 14 wherein said remote data base management system further comprises the MAPPER data base management system.

16. An apparatus comprising:
  (a). means for permitting a user to interact with a data base responsively coupled via a publicly accessible digital data communication network which generates a service request;
  (b). means responsively coupled to said permitting means via said publically accessible digital data communication network for offering data processing services involving access to said data base in response to said service request;
  (c). means for uploading a plurality of files from said permitting means to said offering means using a single service request; and
  (d). means associated with said uploading means for processing each of said plurality of,files within said offering means.

17. An apparatus according to claim 16 wherein said publically accessible digital data communication network further comprises the internet.

18. An apparatus according to claim 17 wherein said permitting means further comprises means for generating and transmitting said single service request.

19. An apparatus according to claim 18 wherein said offering means further comprises MAPPER data base management system.

20. An apparatus according to claim 19 wherein said permitting means further comprises an industry standard personal computer.

* * * * *